F. A. RUFF.
COMBINED MAT AND LUGGAGE CARRIER.
APPLICATION FILED DEC. 3, 1920.
1,418,676.
Patented June 6, 1922.
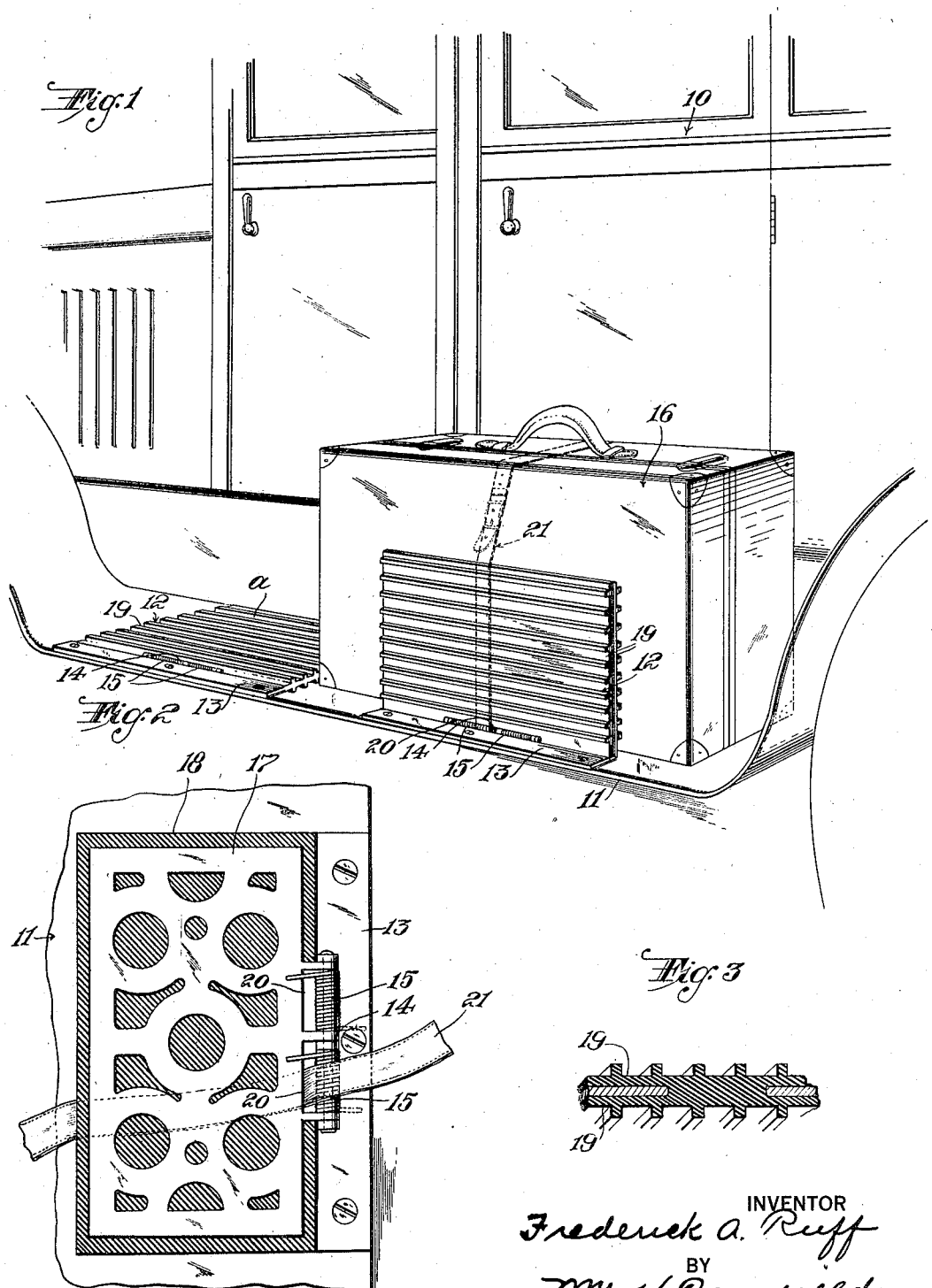

UNITED STATES PATENT OFFICE.

FREDERICK A. RUFF, OF NEWARK, NEW JERSEY.

COMBINED MAT AND LUGGAGE CARRIER.

1,418,676.          Specification of Letters Patent.      Patented June 6, 1922.

Application filed December 3, 1920. Serial No. 427,957.

*To all whom it may concern:*

Be it known that I, FREDERICK A. RUFF, a citizen of the United States, and a resident of Newark, county of Essex, and State of New Jersey, have invented certain new and useful Improvements in Combined Mats and Luggage Carriers, of which the following is a specification.

This invention relates to an improved carrier or holder for luggage or parcels, the carrier being mounted preferably on the step of a vehicle, such as the running board of an automobile. The carrier is adapted for use as a mat or tread when it is not being used as a carrier.

The carrier is held in its position as a mat and as a carrier by a resilient means, such as a spring, and in the case of light packages the spring is sufficiently strong to hold the package securely in the holder, but I provide a means for permitting a strap to pass through the carrier so that the larger and heavier packages or baggage can be strapped on.

The invention is illustrated in the accompanying drawing, in which Figure 1 is a perspective view of part of an automobile showing two of my improved devices in place, one in position as a tread or mat and the other raised to hold a piece of baggage in position. Figure 2 is a top view of a holder with the plate thereof shown in section, and Figure 3 is a detail section of the plate.

In the drawing 10 represents the body of an automobile, and 11 the step or running board. The combined tread and carrier comprises a plate 12 which is pivotally attached to the running board so that it swings inwardly and downwardly to a flat position so that as to form a tread, as at *a* in Figure 1.

To properly attach the device in place I prefer to hinge the plate to a strip 13, the hinge connection 14 being spaced to permit the insertion of the springs 15, which springs yieldingly hold the plate down.

When the device is to be used as a carrier the plate is swung upward, the piece of baggage or the parcel 16 is placed in position and the plate 12 is released. The springs 15 are now under an increased tension and the plate securely holds the baggage against the body of the vehicle or other fixed element so that a clamping of the package is accomplished.

The plate is usually made of a central metal sheet 17, and a covering 18 of rubber or the like is molded around it, the plate being perforated to allow the necessary stiffness, but also to enable a binding of the two faces of rubber. The outer faces 19 are preferably roughened or ribbed, the inner or normally bottom face being thus resilient and ribbed or uneven in order to frictionally bear against and hold the baggage. The other face is so formed in order to provide a wiping or mat surface to prevent slipping and to enable a cleaning of dirt or mud from the shoes before entering the car.

I provide openings, as 20, through which straps 21 or similar binding mediums can be inserted so as to pass close to the hinge around the package and also around the outside of the plate 12. In light packages the strap is unnecessary, but with heavy packages it is advisable.

I claim:

1. A combined mat and luggage carrier comprising a rigid plate, a strip to which the plate is hinged, the strip having means for attaching it to the running board of an automobile, and a resilient covering on both faces of the plate, whereby one face can function as a mat and the other face forms a friction surface for holding baggage.

2. A combined mat and luggage carrier comprising a rigid plate, a strip to which the plate is hinged, the strip having means for attaching it to the running board of an automobile, a resilient covering on both faces of the plate, whereby one face can function as a mat and the other face forms a friction surface for holding baggage, and a spring bearing on the strip and the plate to yieldingly hold the plate flat against the running board.

3. A combined mat and luggage carrier comprising a perforated rigid plate, a strip to which the plate is hinged, the strip being adapted for attachment to the running board of an automobile, a resilient covering in which the perforated plate is molded, the covering having its two outside faces ribbed, and a spring encircling the hinged connection of the strip and the plate to force the plate flat against the running board.

In testimony that I claim the foregoing, I have hereto set my hand, this 2nd day of December, 1920.

FREDERICK A. RUFF.